US006948165B1

(12) United States Patent
Luu et al.

(10) Patent No.: US 6,948,165 B1
(45) Date of Patent: *Sep. 20, 2005

(54) METHOD FOR INSTALLING AN APPLICATION PROGRAM, TO BE EXECUTED DURING EACH BOOTLOAD OF A COMPUTER SYSTEM FOR PRESENTING A USER WITH CONTENT OPTIONS PRIOR TO CONVENTIONAL SYSTEM STARTUP PRESENTATION, WITHOUT REQUIRING A USER'S PARTICIPATION TO INSTALL THE PROGRAM

(75) Inventors: Vu V. Luu, Milpitas, CA (US); Mark F. Vallis, Rancho Santa Margarita, CA (US)

(73) Assignee: Western Digital Ventures, Inc., Lake Forest, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 710 days.

(21) Appl. No.: 09/796,701

(22) Filed: Feb. 28, 2001

(51) Int. Cl.$^7$ ............................. G06F 9/445; G06F 9/44
(52) U.S. Cl. ..................... 717/172; 717/176; 717/171; 717/173; 717/175; 709/221; 714/24; 714/710
(58) Field of Search ................................. 717/171–178; 714/24, 710; 713/2, 165, 1; 703/24; 345/762; 709/221, 220; 707/203

(56) References Cited

U.S. PATENT DOCUMENTS

| 4,434,487 | A | * | 2/1984 | Rubinson et al. ........... 714/710 |
|---|---|---|---|---|
| 5,008,814 | A | * | 4/1991 | Mathur ....................... 709/221 |
| 5,144,659 | A | * | 9/1992 | Jones .......................... 713/165 |
| 5,146,568 | A | * | 9/1992 | Flaherty et al. ................ 703/24 |
| 5,463,766 | A | * | 10/1995 | Schieve et al. ................ 713/2 |
| 5,715,456 | A | * | 2/1998 | Bennett et al. ................ 713/2 |
| 5,784,549 | A | * | 7/1998 | Reynolds et al. ............. 714/24 |
| 5,835,765 | A | * | 11/1998 | Matsumoto ................. 718/102 |
| 5,953,532 | A | * | 9/1999 | Lochbaum .................. 717/176 |
| 6,117,186 | A | * | 9/2000 | Wydall et al. ............... 717/174 |
| 6,154,835 | A | * | 11/2000 | Chrabaszcz et al. ........... 713/1 |

(Continued)

OTHER PUBLICATIONS

Warren S Hersch, Updated install application ships, Oct. 19, 1998, Computer Reseller News, issue 812, p. 170.*

(Continued)

*Primary Examiner*—Anil Khatri
*Assistant Examiner*—Satish S. Rampuria
(74) *Attorney, Agent, or Firm*—Milad G. Shara, Esq.; Robroy R. Fawcett, Esq.

(57) ABSTRACT

The present invention may be embodied in a method, performed in a computer system having a disk drive, for installing an application program for execution under a user's preferred operating system without requiring user intervention. A command is received by the disk drive for reading a first data block to initiate a bootload of the user's preferred operating system. The disk drive detects the command and transfers a second data block which bootloads an installer program for installing the application program. The installer program is executed in the computer system to transfer the application program from a protected area of the disk drive to a user area of the disk drive, to modify a parameter of the user's preferred operating system to cause the application program to be loaded during a bootload of the user's preferred operating system, and to reboot the system to bootload the user's preferred operating system.

9 Claims, 6 Drawing Sheets

U.S. PATENT DOCUMENTS

| | | | |
|---|---|---|---|
| 6,189,051 B1 * | 2/2001 | Oh et al. | 717/175 |
| 6,363,402 B1 * | 3/2002 | Matsuura | 707/203 |
| 6,490,723 B1 * | 12/2002 | Bearden et al. | 717/174 |
| 6,512,526 B1 * | 1/2003 | McGlothlin et al. | 345/762 |
| 6,618,857 B1 * | 9/2003 | Zimniewicz et al. | 717/175 |
| 6,640,334 B1 * | 10/2003 | Rasmussen | 717/171 |
| 6,681,390 B2 * | 1/2004 | Fiske | 717/173 |
| 6,718,373 B1 * | 4/2004 | Bearden et al. | 709/220 |
| 2002/0073413 A1 * | 6/2002 | Goodman | 717/172 |
| 2002/0078434 A1 * | 6/2002 | Murphy et al. | 717/110 |

OTHER PUBLICATIONS

Foster, The installation of large-scale EM programs on desktops, IEEE, Oct. 30, 1989 pp.: 10/1-10/5.*

Leung et al., Developing a company wide estimating, design and installation system (PROTECT) using object-oriented programming, IEEE, Jan. 10, 1994 pp.: 8/1-812.*

Gupta et al., Increasing system availability through on-line software version change, IEEE, 1993 pp.: 30-35.*

* cited by examiner

| DDSAP COMMANDS ||
|---|---|
| REGISTER | VALUE |
| FEATURES | 57h (key, ASCII "W") |
| SECTOR COUNT | 44h (key, ASCII "D") |
| SECTOR NUMBER | 43h (key, ASCII "C") |
| CYLINDER LOW | 03h = RETURN DDSAP START LBA<br>04h = RETURN DDSAP SIZE<br>05h = ENABLE SPOOFING<br>06h = DISABLE SPOOFING<br>07h = OPEN DDSAP<br>08h = CLOSE DDSAP<br>09h = SET APPLICATION INSTALLED FLAG |
| CYLINDER HIGH | 00h |
| COMMAND | 8Ah (VENDOR UNIQUE) |

METHOD FOR INSTALLING AN APPLICATION PROGRAM, TO BE EXECUTED DURING EACH BOOTLOAD OF A COMPUTER SYSTEM FOR PRESENTING A USER WITH CONTENT OPTIONS PRIOR TO CONVENTIONAL SYSTEM STARTUP PRESENTATION, WITHOUT REQUIRING A USER'S PARTICIPATION TO INSTALL THE PROGRAM

BACKGROUND OF THE INVENTION

1. Field of the Invention

The present invention relates to digital information storage, and more particularly, to a method in a computer system having a disk drive with a hidden partition for storage of an application program.

2. Description of the Prior Art

Traditionally, a disk drive provides a nonvolatile disk media for storage of data under the exclusive control of a host computer's operating system. Generally, a user installs an application program on the disk drive from a portable media such as floppy disk and/or compact-disk read-only-memory (CDROM), or from another computer over a network. Thus, the user participates in the installation of the application program. Such installation activity fails to take advantage of the capacity and the capability of current disk drives.

Accordingly, there exists a need for permitting installation of an application program on a disk-drive without user participation and without requiring distribution using portable media or an online connection. The present invention satisfies these needs.

SUMMARY OF THE INVENTION

The present invention may be embodied in a method, performed in a computer system having a disk drive with a user's preferred operating system installed on the disk drive, for installing an application program on the disk drive for execution under the user's preferred operating system without requiring user intervention. The method includes receiving a command in the disk drive for reading a first data block to initiate a bootload of the user's preferred operating system and detecting the command in the disk drive. In response to detecting the command, transferring a second data block which, when executed in the computer system, bootloads an installer program for installing the application program. The method further includes executing the installer program in the computer system to transfer the application program from a protected area of the disk drive which is inaccessible to the user's preferred operating system to a user area of the disk drive which is accessible to the user's preferred operating system, to modify a parameter of the user's preferred operating system to cause the application program to be loaded during a bootload of the user's preferred operating system, and to reboot the system to bootload the user's preferred operating system.

In more detailed features of the invention, the installer program may include a self-install operating system for transferring the application program from the protected area to the user area, an application install routine for modifying a parameter of the user's preferred operating system to cause the application program to be loaded during a bootload of the user's preferred operating system, and a reboot routine for bootloading the user's preferred operating system. The second data block may include a drive-selected master boot record that bootloads the installer program by enabling address spoofing and by loading the self-install operating system from the protected area using address spoofing. The self-install operating system may transfer the application program from the protected area to the user area by disabling address spoofing, opening the protected area, copying the application program from the protected area to the user area, and closing the protected area. The self-install operating system may copy the application install routine from the protected area before closing the protected area and may invoke the application install routine after closing the protected area to install the application program and modify the parameter of the user's preferred operating system.

Further, the application program may be executed at each subsequent bootload of the user's preferred operating system for presenting the user with a content option prior to a startup presentation of the user's preferred operating system. The installer program may include an extended-address interrupt routine for addressing data sectors outside of a range of the computer system's native interrupt routine. The extended-address interrupt routine may be used to transfer the application program from the protected area to the user area.

Alternatively, the present invention may be embodied in a computer system including a disk drive and a host controller. The disk drive has a disk controller, and a disk including a host-accessible area and a host-inaccessible area. The host accessible area stores a host-selected master boot record, a host-selected operating system, and a host-selected application program. The host-inaccessible area stores a drive-selected master boot record, a drive-selected operating system, and a drive-selected application program. The disk controller includes controller memory for storing a boot record substitution program. The host controller has a host processor and a host memory for storing a basic input output services (BIOS) program. The host processor is responsive to the BIOS program for generating a first boot command to read the host-selected master boot record so that the host-selected operating system is subsequently loaded in the host memory. The boot record substitution program performs the steps of detecting the first boot command and subsequently generating a command for recovering the drive-selected master boot record from the host-inaccessible area so that the recovered drive-selected master boot record is subsequently stored in the host memory. The host processor is responsive to the recovered drive-selected master boot record that is stored in the host memory for loading the drive-selected operating system in the host memory. The host processor, using the drive-selected operating system, installs the drive-selected application program in the host accessible disk area and modifies a parameter of the host-selected operating system so that the drive-selected application program is executed in response to a subsequent loading of the parameter modified host-selected operating system. The host processor generates a second boot command to read the host-selected master boot record so that the parameter-modified host-selected operating system is recovered from the host-accessible area and subsequently loaded in the host memory such that the drive-selected application program is executed in response to the parameter-modified host-selected operating system being loaded in the host memory.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
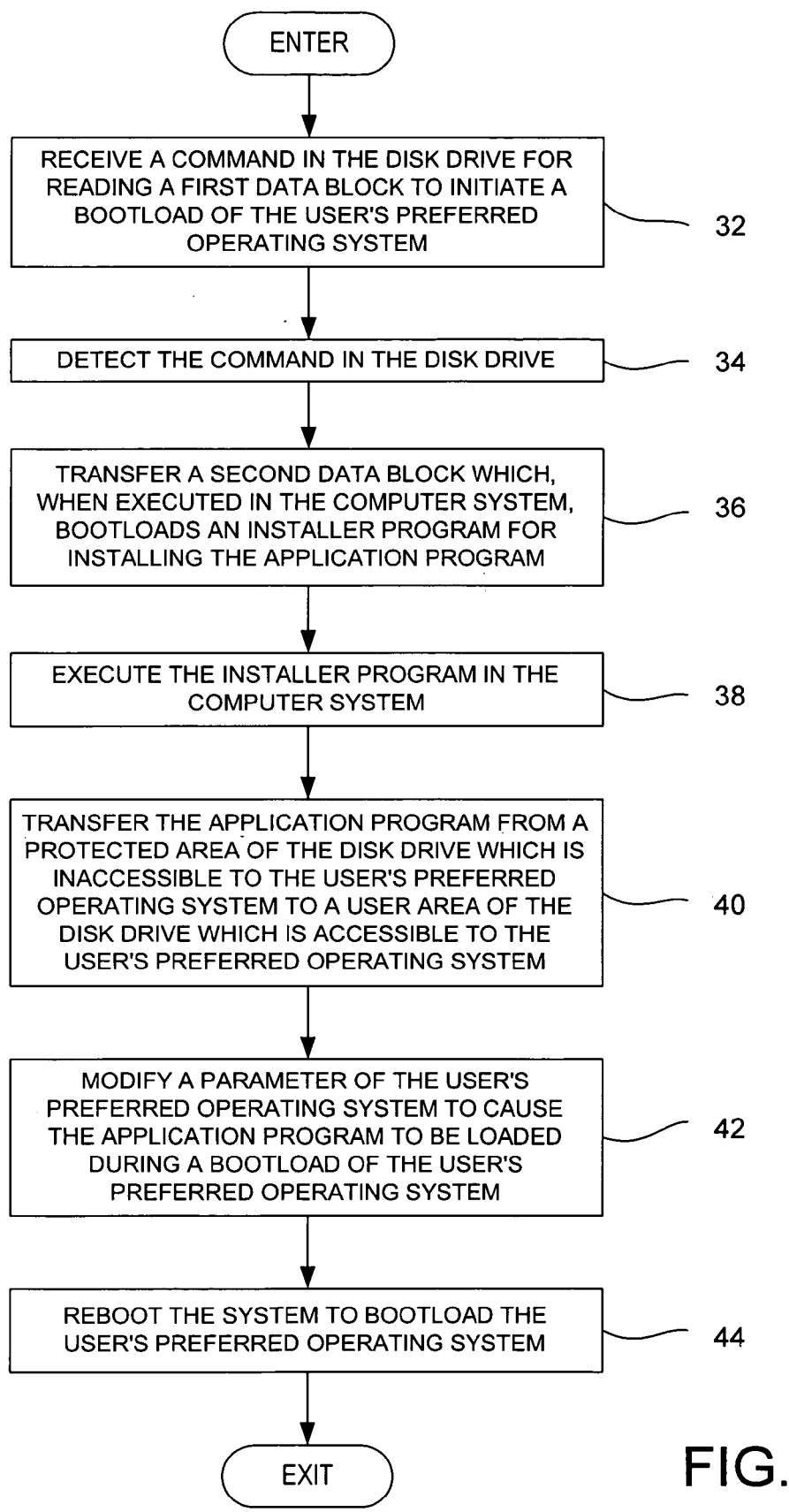
FIG. 1 is a flow diagram illustrating a method for installing an application program, for execution under a user's preferred operating system, without requiring user intervention, according to the present invention.
Figure 2:
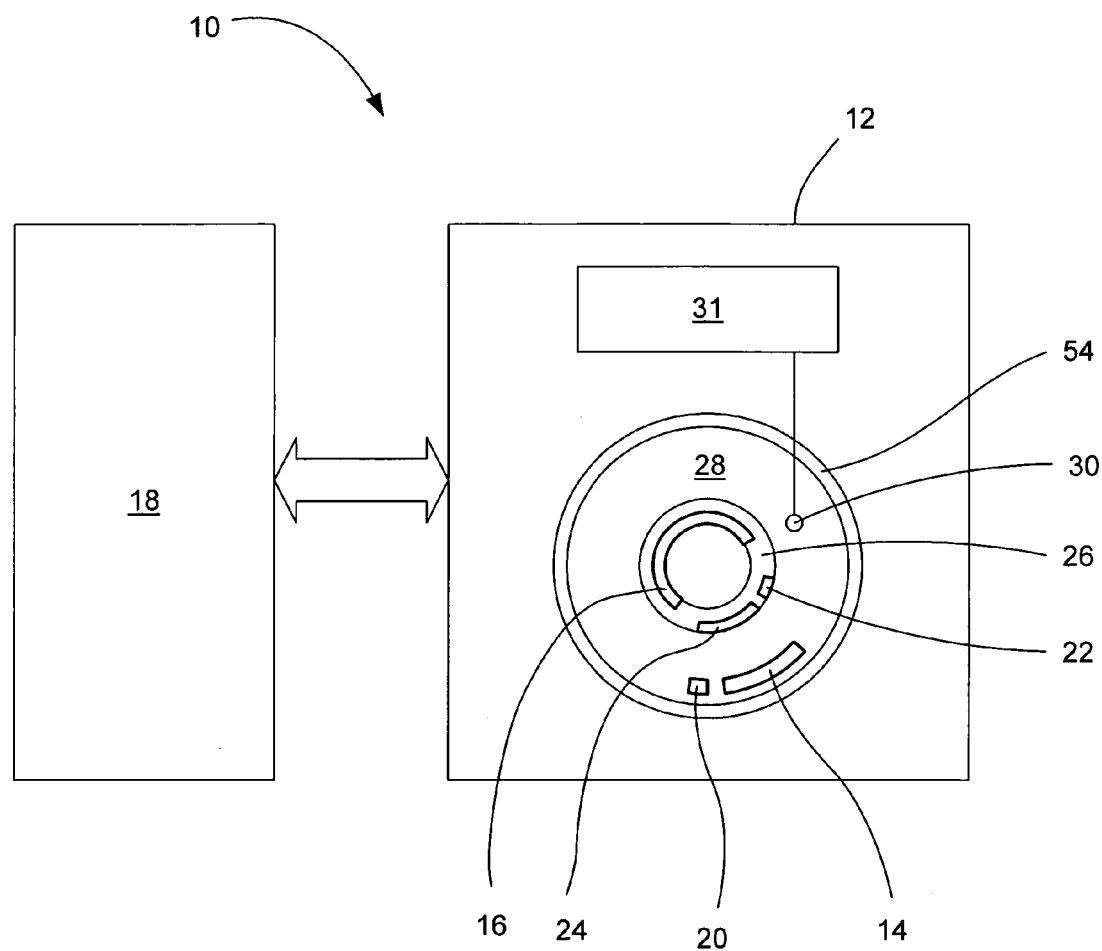
FIG. 2 is a block diagram of a computer system having a host computer coupled to a disk drive for implementing the method for installing an application program without user intervention of FIG. 1.

With reference to FIGS. 1 and 2, the present invention may be embodied in a method (FIG. 1), performed in a computer system 10 (FIG. 2) having a disk drive 12 with a user's preferred operating system 14 installed on the disk drive, for installing an application program 16 on the disk drive for execution under the user's preferred operating system without requiring user intervention. The method includes receiving, from a host computer 18, a command in the disk drive for reading a first data block 20 to initiate a bootload of the user's preferred operating system (step 32) and detecting the command in the disk drive (step 34). In response to detecting the command, transferring a second data block 22 which, when executed in the computer system, bootloads an installer program 24 for installing the application program (step 36). The method further includes executing the installer program in the computer system (step 38) to transfer the application program from a protected area 26 of the disk drive which is inaccessible to the user's preferred operating system to a user area 28 of the disk drive which is accessible to the user's preferred operating system (step 40), to modify a parameter of the user's preferred operating system to cause the application program to be loaded during a bootload of the user's preferred operating system (step 42), and to reboot the system to bootload the user's preferred operating system (step 44).

After the application program 16 is in the user area 28, it may be executed by the host computer 18 during each bootload of the user's preferred operating system 14. The application program may provide a variety of options to a user including presenting the user with content options prior to conventional bootload startup presentations of the user's preferred operating system or prior to presentations of other application programs.

Figure 3:
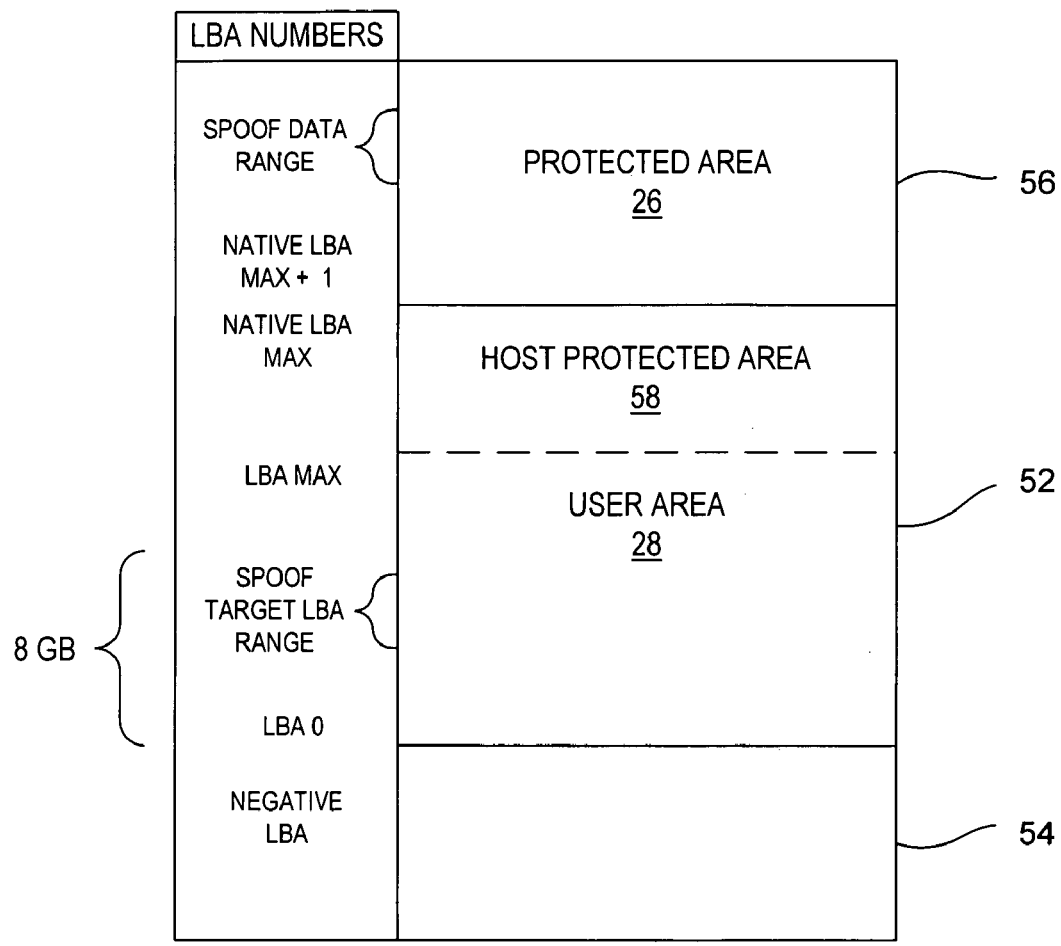
FIG. 3 is a block diagram illustrating the organization of data storage sectors in the disk drive of FIG. 2.

The disk media of the disk drive 12 is accessed using a head assembly 30 and may be divided into data storage sectors, each generally storing 512 data bytes. Each sector may be addressed using a logical block address (LBA). A linear addressing scheme using the LBAs for addressing the sectors is shown in FIG. 3. The data storage sectors are organized into a user partition 52, a drive management partition 54, and a disk-drive-selected application partition 56. The user partition includes the user area 28 and may be assigned to LBA numbers 0 through a native maximum (MAX) LBA. The host computer 18 may access the data storage sectors in the user partition using an industry standard interface protocol such as the AT Attachment (ATA) Interface between host computers and storage devices. The ATA standard also defines a host protected area 58 within the user partition for data storage outside the normal file system of the host computer's operating system 14. The operating system cannot change data in the host protected area. The host protected area is intended for use only by the host computer system's basic input output services (BIOS) or other low-level boot time process when the storage device is initially configured.

The drive management partition 54 may be assigned to negative LBA numbers and the corresponding data storage sectors may be accessed using drive management commands. The data in the drive management partition generally includes disk drive configuration and physical format information written by the disk-drive manufacturer during initial testing and configuration of the disk drive. The drive management commands generally vary from manufacturer to manufacturer.

The disk-drive-selected application partition (DDSAP) 56 includes the protected area 26 and is assigned to "spare" data storage sectors above the native MAX LBA number. Generally, the DDSAP is configured by the manufacturer before shipment of the disk drive 12. The DDSAP sectors are visible to the disk drive's microprocessor-based internal controller 31 (FIG. 2) but normally are not visible to the host computer 18. Accordingly, data stored in the DDSAP may not be destroyed by logical partitioning and formatting processes performed on the user partition 52.

The host computer 18, when initially turned on, boots up by requesting a host-selected master boot record (MBR) for the user's preferred operating system 14 from LBA 0 of the user partition 52. The first data block 20 may comprise the host-selected MBR. However, the disk drive 12 may determine that an application program 16 in the protected area 26 is not installed in the user partition. Accordingly, the disk drive may respond to the LBA 0 request by returning a disk-drive-selected MBR that directs the host computer to install the application program from the protected area to the user partition. The second data block 22 may comprise the drive-selected MBR. After installation, the disk drive may direct the host computer to reboot and the disk drive then responds to the next LBA 0 request with the host-selected MBR resulting in a normal boot process.

Direct access to the protected area 26 may not be available in host computers 18 having a power-on-self-test (POST) procedure. The POST procedure may be performed after the host computer is turned on, but before the MBR is requested, and may include obtaining information relating to the size of the disk drive 12 (i.e., the MAX LBA value) and making the size information available to the interrupt routines of the BIOS. Generally, the POST procedure may include only the user partition 52 and user area 28, and may not detect and include the protected area, in the size information. Accordingly, the interrupt routines of the BIOS may not be able to access the sectors having LBA numbers beyond the native MAX LBA number reported by the POST procedure.

Another concern that arises with respect to accessing data in the protected area 26 relates to an internal limitation of older host computers 18. For example, some older models of microprocessor-based host computers have a native BIOS interrupt routine (Int 13h) for reading and writing data that cannot address LBA numbers that correspond to a storage capacity beyond about 8 Gigabytes. An extended-address interrupt routine may be installed in a host computer having a BIOS with a limited LBA range that replaces the native interrupt routine of the BIOS. However, the host computer cannot access sectors beyond the BIOS limit until the extended-address interrupt routine has been loaded, typically from the disk drive 12. Accordingly, the host computer may not be able to access the protected area if the protected area lies above the limited LBA range of the native interrupt routines of the BIOS.

The disk drive 12 may overcome the LBA addressing limitations of the native interrupt routine of the BIOS by "spoofing" sector addresses within a target LBA range. In LBA address spoofing, the host computer 18 requests data from a sector having a target LBA number that is within the address range of the native interrupt routine. The disk drive, however, substitutes the host-requested data with drive-selected data from a sector, within a spoof data range, that has an LBA number that is above the address range of the native interrupt routine. The spoof target LBA range is typically within the user area 28 and the spoof data range is typically within the protected area 26.

Figure 4:
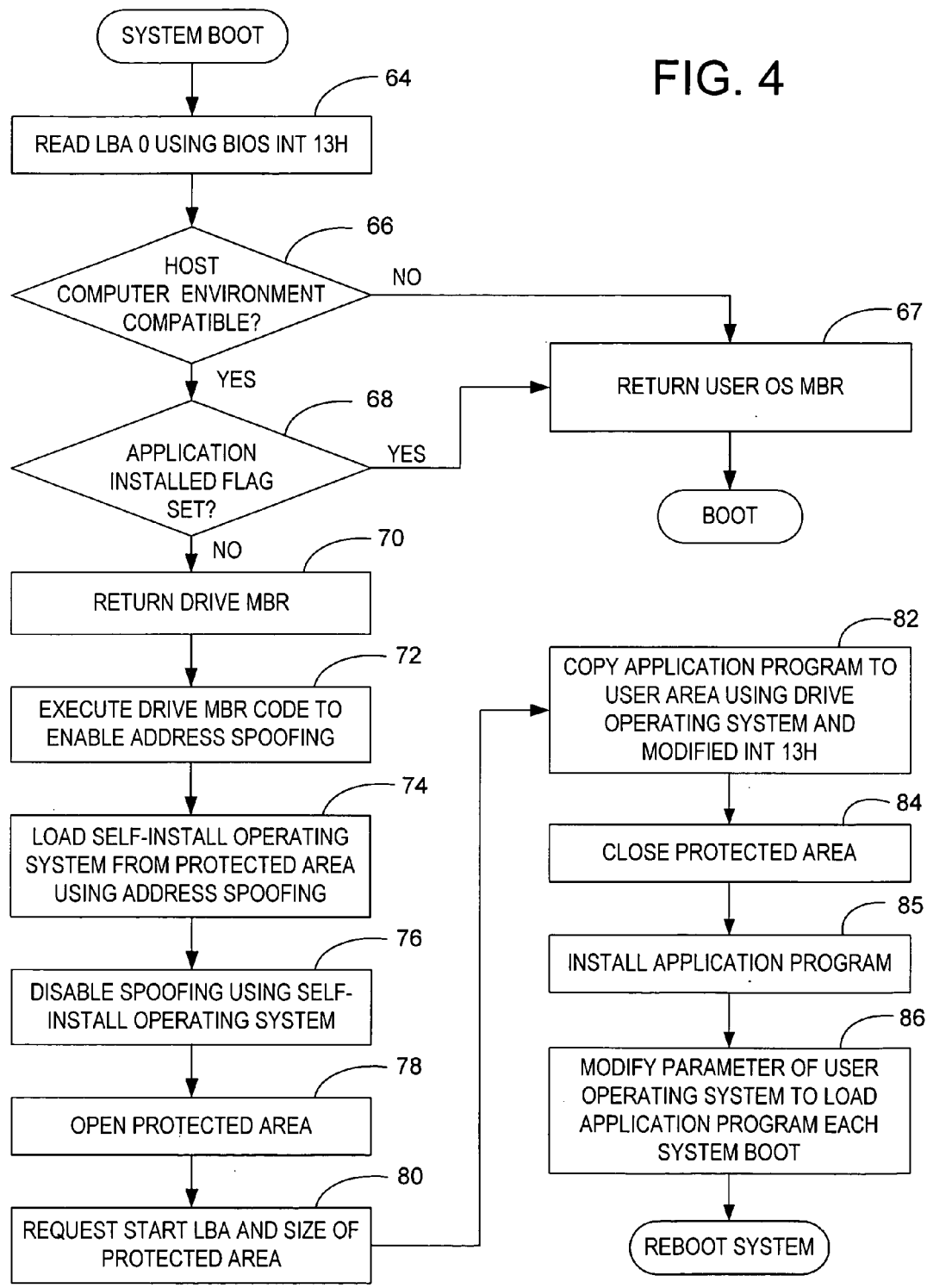
FIG. 4 is a flow diagram illustrating a method for overcoming a native interrupt routine addressing limitation for use in the method of FIG. 1.

A process for address spoofing of host data requests is shown in FIG. 4. Upon system boot, the host computer 18 issues a command to read LBA 0 from the disk drive 12 using the native interrupt routine (Int 13h) of the BIOS (step 64). The disk drive determines whether the user's preferred operating system 14 provides an environment that is compatible with the application program and the automatic installation procedure (step 66). If the operating system fails to provide a compatible environment, the drive returns the MBR for the user's preferred operating system in response to the read LBA 0 command and the normal boot process continues (step 67). Otherwise, the disk drive determines whether an application-installed flag is set (step 68). If the application-installed flag is set, the disk drive also returns the MBR for the user's preferred operating system (step 67) and the normal boot process continues. If the application-installed flag is not set, the disk drive 12 returns a drive-selected MBR (step 70). The drive-selected MBR may be stored in the protected area 26 and/or in the drive-management partition 54. The drive-selected MBR includes code executed by the host computer that enables address spoofing (step 72). While address spoofing is enabled, the host computer requests, using the native interrupt routine of the BIOS, data from target LBA numbers that are within the range of the native interrupt routine. The disk drive spoofs the request by providing data from LBA numbers outside of the range of the native interrupt routine, such as from the protected area. Thus, an alternate self-install operating system may be loaded to temporarily operate the host computer (step 74). The self-install operating system includes an extended-address interrupt routine that replaces the native interrupt routine of the BIOS. The self-install operating system disables address spoofing (step 76) and opens the protected area (step 78). A start LBA number and the size of the protected area are requested (step 80). The application program 16 is copied to the user area 28 using the extended-address interrupt routine (step 82) and the protected area is closed (step 84). The application program is installed (step 85) and a parameter of the user's preferred operating system is modified to load the application program on the next system boot (step 86), and computer system 10 is commanded to reboot.

As an example, in the Microsoft® Windows operating system, the application program 16 may be installed in the user area 28 using an application install routine. The application install routine may be placed in the startup directory of the operating system for installing the application program. During the next bootload of the operating system, the application install routine may be executed for installing the application program. During the installation, the application install routine may remove itself from the startup directory and an entry may be placed in the registry for executing the application program on each subsequent bootload of the operating system.

A compatible environment depends on the nature of the user's preferred operating system 14, the application program 16, and the installer program 24. For example, if the application program is designed to run within the Microsoft® Windows operating system, the disk drive 12 looks for a signature (i.e., 55AA) in the host-selected MBR. If the signature is located, the environment may be compatible with a drive-selected operating system, such as the Linux operating system kernel, that may access the Windows file structure. The disk drive also may access the host-selected MBR to provide the disk drive's partition tables to the drive-selected operating system by means of the drive-selected MBR. Otherwise, if the signature is not located, the normal boot process is implemented.

Figures 5, 6:
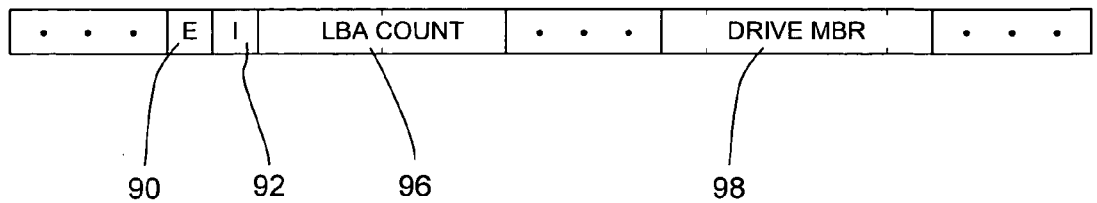
FIG. 5 is a schematic diagram illustrating a data structure used in the disk drive of FIG. 2.
FIG. 6 is table of commands for locating and controlling access to a protected area of the disk-drive of FIG. 2.

The microprocessor-based controller 31 of the disk drive 12 is operated by internal firmware and includes a data structure shown in FIG. 5. The data structure may be included in a sector stored in the drive management partition 54. Included in the data structure is an enable bit 90 for indicating whether the disk-drive may support an installation of a disk-drive-selected application. Also included is a bit for an application-installed flag 92 that is set after the application program has been installed in the user area 28. An LBA count double-byte word 96 indicates the size of the protected area 26. Also, data bytes 98 for the drive MBR may be stored in the sector.

The DDSAP 56 is accessed by using the commands shown in FIG. 6. The commands are implemented by placing the predetermined command values in the registers of the disk drive 12. A vendor unique command value (8Ah) may be placed in the command register and a value of 00h may be placed in the cylinder high register. The desired DDSAP command may be placed in the cylinder low register. A manufacturer access code may be placed in the sector number, sector count and features registers. The DDSAP commands may include a RETURN DDSAP START LBA command (03h), a RETURN DDSAP SIZE command (04h), an OPEN DDSAP command (07h), and a CLOSE DDSAP command (08h). The RETURN DDSAP START LBA command returns the number of the starting LBA of the DDSAP. The RETURN DDSAP SIZE command returns a count of the number of LBAs in the DDSAP. After receiving an OPEN DDSAP command, the disk drive allows write and read commands issued by the host computer 18 to access the DDSAP sectors. The write and read commands may be standard ATA write and read commands. After receiving a CLOSE DDSAP command, the disk drive forbids access to the DDSAP sectors and returns an error or abort in response to host commands directed to the DDSAP sectors. The DDSAP commands may also include a SET APPLICATION INSTALLED FLAG command (09h) for indicating whether the disk-drive-selected application program 16 has been installed from the DDSAP to the user partition 52 for execution by the host computer.

A disk drive 12 having a microprocessor-based controller 31 and that may substitute an LBA request with alternative data is described in U.S. patent application Ser. No. 09/507,121, filed on Feb. 17, 2000, titled "DISK DRIVE FOR SELECTIVELY SATISFYING A READ REQUEST FROM A HOST COMPUTER FOR A FIRST VALID DATA BLOCK WITH A SECOND VALID DATA BLOCK", which application is incorporated herein by reference. The disk-drive includes firmware used by the microprocessor-based controller for implementing the operation of the methods of the invention and the data structures used in the invention.

Figure 7:
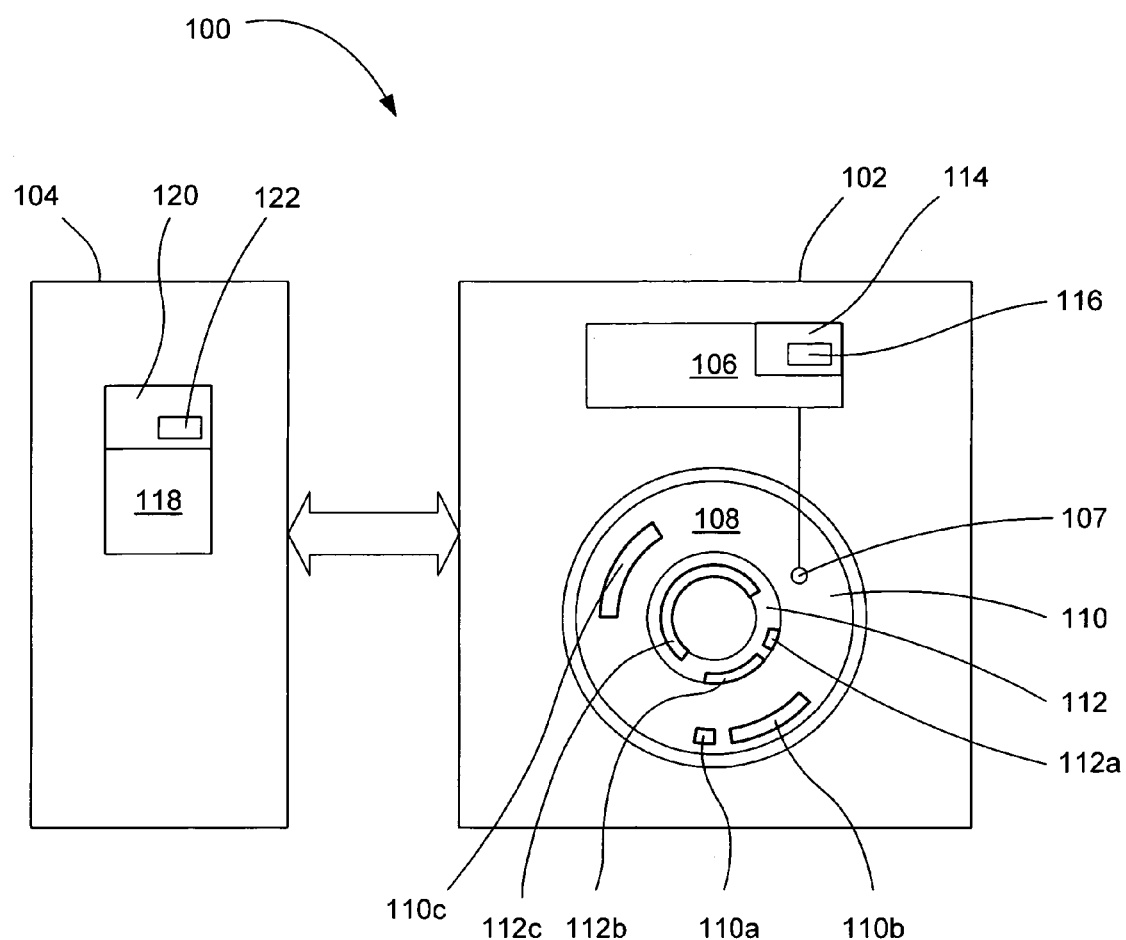
FIG. 7 is a block diagram of an alternative embodiment of a computer system for installing an application program without user intervention, according to the present invention.

As shown in FIG. 7, alternatively the present invention may be embodied in a computer system 100 including a disk drive 102 and a host controller 104. The disk drive has a disk controller 106, a head assembly 107, and a disk 108 including a host-accessible area 110 and a host-inaccessible area 112. The host accessible area stores a host-selected master boot record 110a, a host-selected operating system 10b, and a host-selected application program 110c. The host-inaccessible area stores a drive-selected master boot record 112a, a drive-selected operating system 112b, and drive-selected application program 112c. The disk controller includes controller memory 114 for storing a boot record substitution program 116. The host controller has a host processor 118 and a host memory 120 for storing a BIOS program 122. The host processor is responsive to the BIOS program for generating a first boot command to read the host-selected master boot record so that the host-selected operating system is subsequently loaded in the host memory. The boot record substitution program performs the steps of detecting the first boot command and subsequently generating a command for recovering the drive-selected master boot record from the host-inaccessible area so that the recovered drive-selected master boot record is subsequently stored in the host memory. The host processor is responsive to the recovered drive-selected master boot record that is stored in the host memory for loading the drive-selected operating system in the host memory. The host processor, using the drive-selected operating system, installs the drive-selected application program in the host accessible disk area and modifies a parameter of the host-selected operating system so that the drive-selected application program is executed in response to a subsequent loading of the parameter modified host-selected operating system. The host processor generates a second boot command to read the host-selected master boot record so that the parameter-modified host-selected operating system is recovered from the host-accessible area and subsequently loaded in the host memory such that the drive-selected application program is executed in response to the parameter-modified host-selected operating system being loaded in the host memory.

We claim:

1. In a computer system having a disk drive with a user's preferred operating system installed on the disk drive, a method for installing an application program for execution under the user's preferred operating system without requiring user intervention, the method comprising:
  receiving a command in the disk drive for reading a first data block to initiate a bootload of the user's preferred operating system;
  detecting the command in the disk drive and in response to detecting the command, transferring a second data block which, when executed in the computer system, bootloads an installer program for installing the application program;
  executing the second data block to bootload the installer program in the computer system to:
    transfer the application program from a protected area of the disk drive which is inaccessible to the user's preferred operating system to a user area of the disk drive which is accessible to the user's preferred operating system;
    modify a parameter of the user's preferred operating system to cause the application program to be loaded during a bootload of the user's preferred operating system; and
    reboot the system to bootload the user's preferred operating system.

2. A method for installing an application program as defined in claim 1, further comprising executing the application program at each subsequent bootload of the user's preferred operating system for presenting the user with a content option prior to a startup presentation of the user's preferred operating system.

3. A method for installing an application program as defined in claim 1, wherein the second data block includes a drive-selected master boot record that bootloads the installer program by enabling address spoofing and by loading a self-install operating system from the protected area using address spoofing.

4. A method for installing an application program as defined in claim 1, wherein the installer program includes a self-install operating system for transferring the application program from the protected area to the user area, an application install routine for modifying a parameter of the user's preferred operating system to cause the application program to be loaded during a bootload of the user's preferred operating system, and a reboot routine for bootloading the user's preferred operating system.

5. A method for installing an application program as defined in claim 4, wherein the self-install operating system includes an extended-address interrupt routine for addressing data sectors outside of an address range of a native interrupt routine of the computer system.

6. A method for installing an application program as defined in claim 5, wherein the extended-address interrupt routine is used to transfer the application program from the protected area to the user area.

7. A method for installing an application program as defined in claim 1, wherein:
  the installer program includes a self-install operating system for transferring the application program from the protected area to the user area, an application install routine for modifying a parameter of the user's preferred operating system to cause the application program to be loaded during a bootload of the user's preferred operating system, and a reboot routine for bootloading the user's preferred operating system;
  the second data block includes a drive-selected master boot record that bootloads the installer program by enabling address spoofing and by loading the self-install operating system from the protected area using address spoofing; and
  the self-install operating system transfers the application program from the protected area to the user area by disabling address spoofing, opening the protected area, copying the application program from the protected area to the user area, and closing the protected area.

8. A method for installing an application program as defined in claim 7, wherein the self-install operating system copies the application install routine from the protected area to the user area before closing the protected area and invokes the application install routine after closing the protected area to install the application program and modify the parameter of the user's preferred operating system to cause the application program to be loaded during a bootload of the user's preferred operating system.

9. A computer system, comprising:
   a disk drive having
      a disk including a host-accessible area and a host-inaccessible area, the host-accessible area storing a host-selected master boot record and a host-selected operating system, and the host-inaccessible area storing a drive-selected master boot record, a drive-selected operating system, and a drive-selected application program;
      a disk controller including controller memory for storing a boot record substitution program;
   a host controller including
      a host memory for storing a basic input output services (BIOS) program;
      a host processor is responsive to the BIOS program for generating a first boot command to read the host-selected master boot record so that the host-selected operating system is subsequently loaded in the host memory;
   wherein:
      the boot record substitution program performs the steps of detecting the first boot command and subsequently generating a command for recovering the drive-selected master boot record from the host-inaccessible area so that the recovered drive-selected master boot record is subsequently stored in the host memory;
      the host processor is responsive to the recovered drive-selected master boot record that is stored in the host memory for loading the drive-selected operating system in the host memory in order to perform the steps of:
         installing the drive-selected application program in the host accessible disk area and modifying a parameter of the host-selected operating system so that the drive-selected application program is executed in response to a subsequent loading of the parameter modified host-selected operating system;
         generating a second boot command to read the host-selected master boot record so that the parameter-modified host-selected operating system is recovered from the host-accessible area and subsequently loaded in the host memory such that the drive-selected application program is executed in response to the parameter-modified host-selected operating system being loaded in the host memory.

\* \* \* \* \*